Patented Jan. 1, 1952

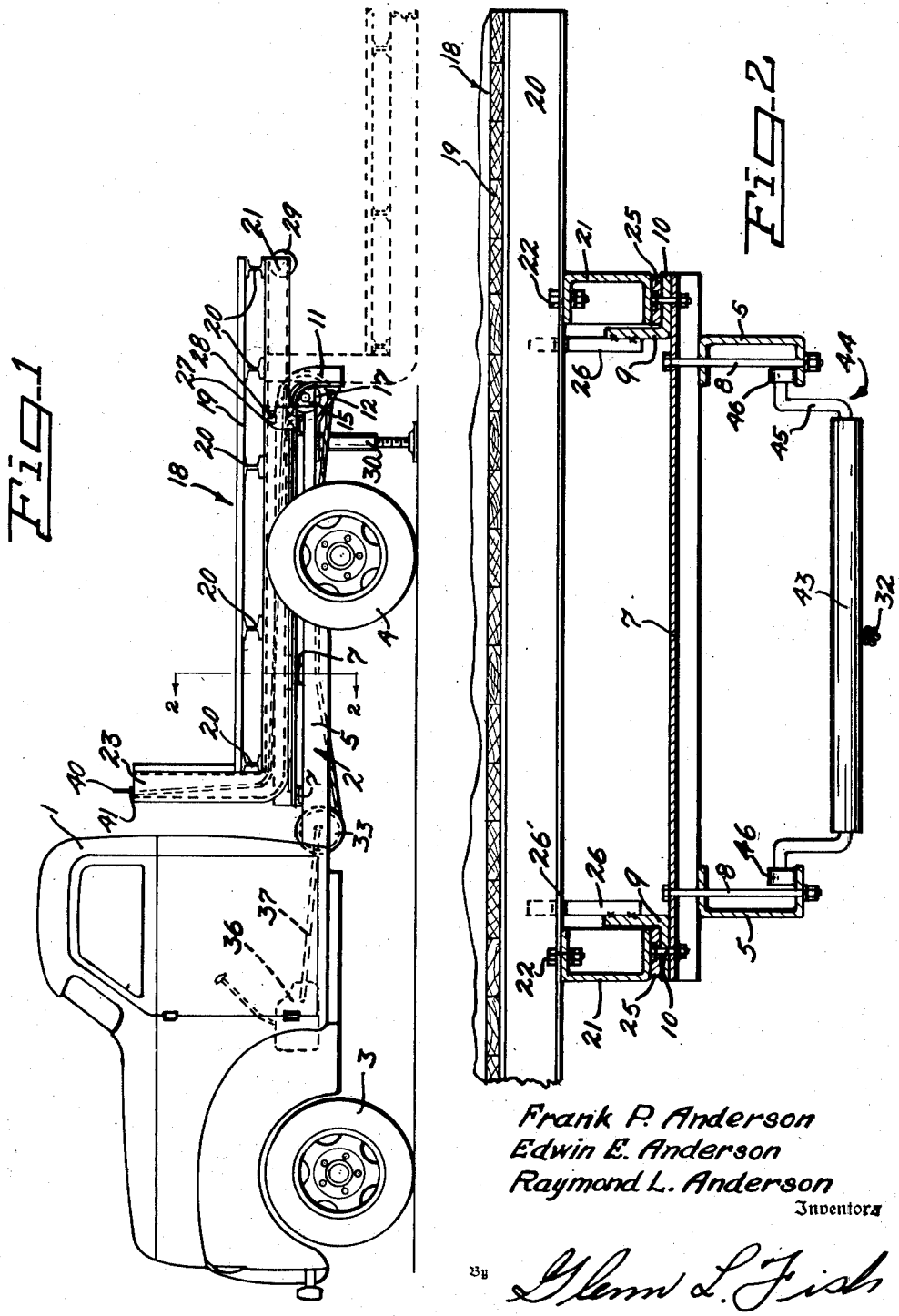

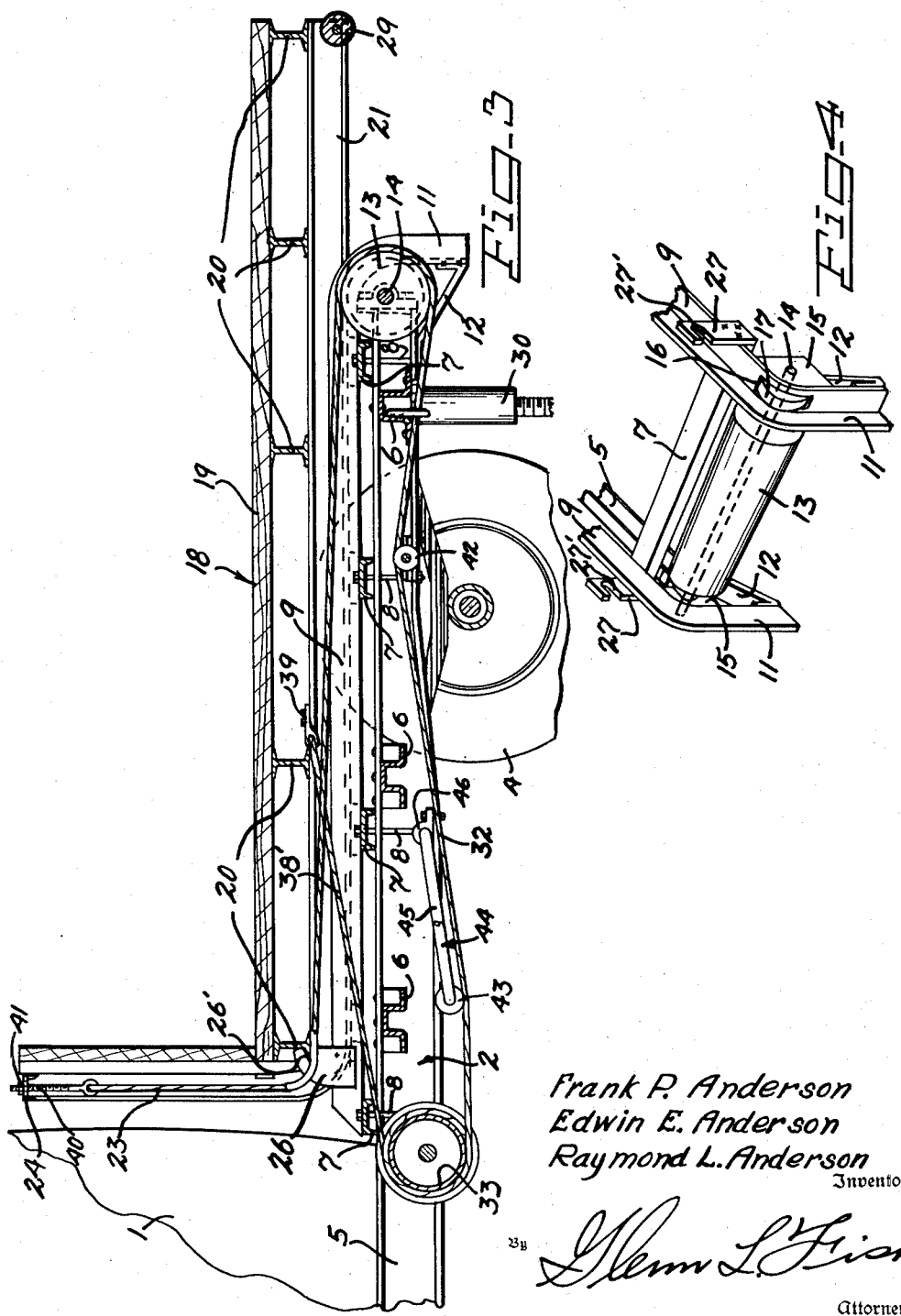

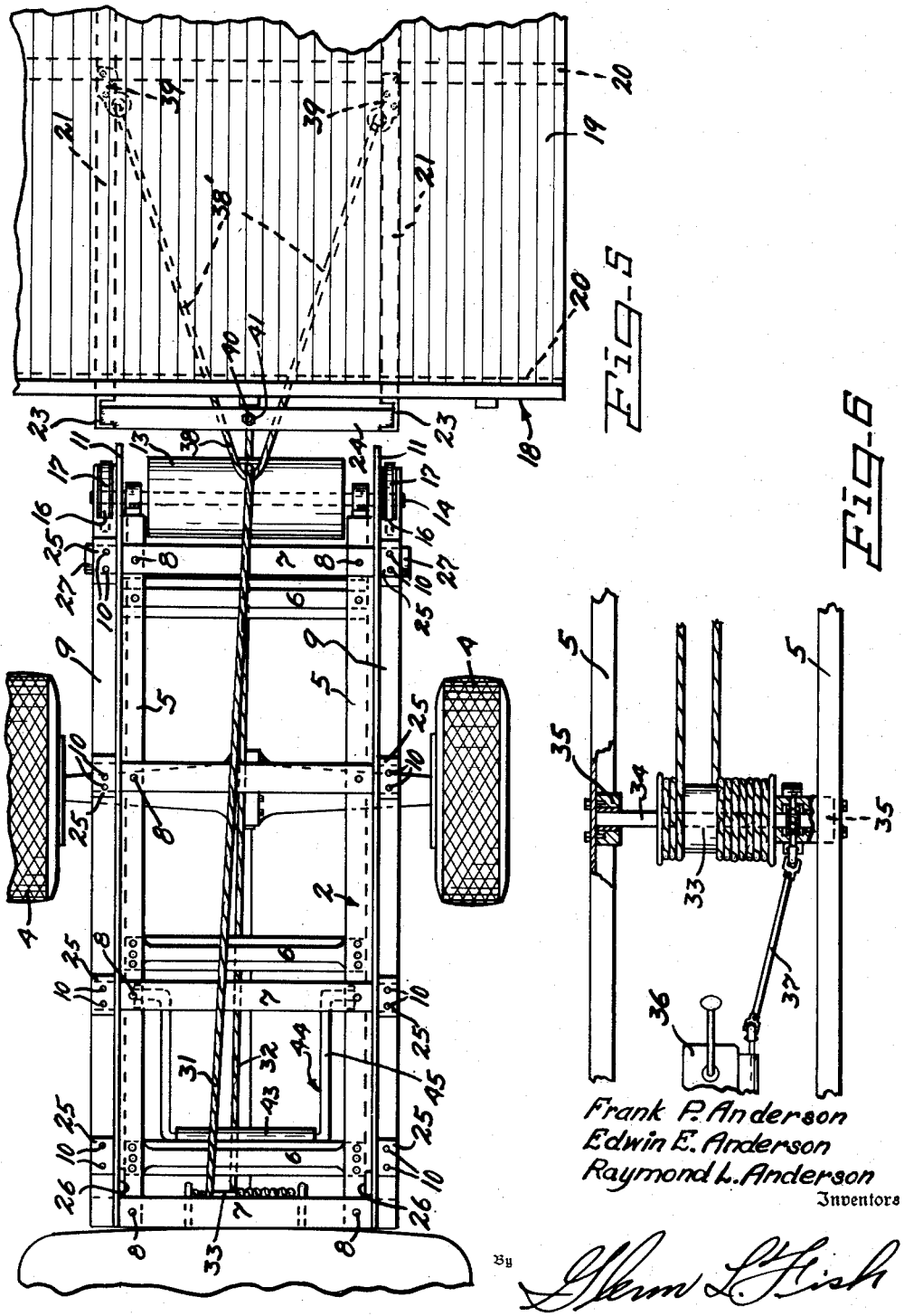

2,580,501

UNITED STATES PATENT OFFICE 2,580,501

FREIGHT LOADING AND UNLOADING TRUCK

Frank P. Anderson, Edwin E. Anderson, and
Raymond L. Anderson, Spokane, Wash.

Application April 14, 1949, Serial No. 87,452

6 Claims. (Cl. 214—85)

This invention relates to trucks of the motor vehicle type and more particularly to a truck body, it being one object of the invention to provide a truck with a body so mounted upon the chassis of the truck that the body may be shifted from a position in which it rests upon the chassis to a position in which it is disposed rearwardly of the chassis and rests upon the ground and material may be conveniently removed from the body or the body loaded and then shifted forwardly and upwardly onto the chassis.

Another object of the invention is to provide the truck with a chassis carrying rails upon which side beams of the body rests, a roller being mounted transversely of the chassis between rear ends of the rails and the side beams of the body having upturned front end portions constituting arms or uprights for engaging the roller and guiding movement of the body onto and off of the chassis.

Another object of the invention is to provide improved means for engaging the body and holding it flat upon the rails so that the body will be prevented from accidentally shifting out of its proper position and tilting across the rear end of the chassis while the truck is being driven from one place to another.

Another object of the invention is to provide a truck having a body mounted for longitudinal shifting movement and vertical tilting movement, the body being so moved by mechanism driven from the power take-off of the truck.

Another object of the invention is to provide a truck having a body movable onto and off of the chassis very easily and of such construction that it will be very strong and not liable to be broken by strains or by jolts received when it is tilted to an inclined position or returned to a horizontal position upon the chassis.

The invention is illustrated in the accompanying drawings wherein:

Fig. 1 is a side elevation of the improved truck.

Fig. 2 is a transverse sectional view upon an enlarged scale taken along the line 2—2 of Figure 1.

Fig. 3 is a sectional view taken longitudinally through the truck body and the chassis of the truck.

Fig. 4 is a fragmentary perspective view of the rear end portion of the rails along which the body moves onto and off of the chassis.

Fig. 5 is a top plan view of the improved truck showing the body shifted rearwardly off of the chassis and disengaged from the rails.

Fig. 6 is a fragmentary top plan view of the chassis showing the drum upon which cables are wound.

The truck in which the improved body has been shown incorporated has a cab 1, a chassis 2, and front and rear wheels 3 and 4. The chassis has the usual chassis bars 5 held parallel to each other by braces 6 and across these chassis bars are mounted cross bars 7 which are secured to the chassis bars by bolts 8. Rails 9 which are formed of angle metal extend longitudinally of the chassis and are secured upon end portions of the cross bars by bolts 10 and disposed outwardly of the chassis bars 5 in parallel relation thereto as shown in Figures 2 and 5. Rear end portions of the rails project beyond the chassis bars, and these end portions are bent downwardly to form depending arms 11 which are held in the vertical position shown in Figures 3 and 4 by braces 12. A roller 13 is rotatably mounted between upper ends of the downwardly extending arms 11 by a shaft or axle 14 which has its end portions rotatably mounted through bearing plates 15 carried by rails and in the curved portions of the rails under which the bearing plates are located are formed openings 16 through which projects wheels 17 carried by the axle 14.

The body 18 is normally at rest upon the chassis but is slidable longitudinally thereof for movement onto and off of the chassis. This body has a platform 19 which may be formed of a suitable number of longitudinally extending boards or of other suitable material. The boards are appropriately secured upon cross bars 20 formed of I-beams, and these I-beams are secured upon side bars or runners 21 by bolts 22, the runners being formed of channel bars and having their forward portions bent upwardly to form standards 23 at opposite sides of the front end of the platform which have their upper ends secured to ends of a cross bar 24. Wear plates 25 are secured upon the horizontal portions of the rails 9 by the fasteners 10 and hold the runners in slightly spaced relation to the rails so that the body may be easily slid longitudinally along the rails, and without excess wear between the rails and the runners. Latch plates or keepers 26 and 27 which are formed near their upper ends with transverse slots 26' and 27' are mounted upright against side portions of front and rear ends of the rails. When the body is shifted forwardly along the rails the base of the front cross bar 20 engages in the slots of the keepers 26 and pins 28 which project laterally from the runners engage in the slots of the rear keepers 27. The body will thus be prevented from accidentally tilting out of a position in which it rests flat upon the rails. When the body is shifted rearwardly the rear portion will eventually tilt downwardly until rear ends of the runners 21 reach the ground. During this movement the runners rest upon the wheels 17 which allow the body to move easily across the downwardly bent arms 11 of the rails and in order to allow the rear ends of the runners to slide easily along the ground the runners carry a roller 29 at the rear end. When the front end of the body reaches the rear ends of the rails 9 the standards 23 move downwardly along the downturned end portions 11 of the rails. While these standards have shown spaced somewhat from the downturned ends of the rails in Figure 5 it is to be understood that they have been so shown for sake of clearness and that they remain in contact with the rails, as indicated by dotted lines in Figure 1. By having the standards remain in contact with the downturned ends of the rails they will easily move upwardly and guide return of the body onto the rails when returning the body to its normal position upon the rails. Since the weight of a loaded body is liable to tilt the truck downwardly across its rear axle when the body is in a position rearwardly of the rear axle a jack 30 of the type used when changing tires is placed under the rear portion of the truck and adjusted upwardly until it has supporting engagement with the rear one of the braces 6.

Movement of the body along the rails is effected by means of cables 31 and 32 which are wound in opposite directions upon a drum 33. The drum is rotatably mounted between the chassis bars 5 by a shaft 34 mounted in bearings 35 and rotary motion is imparted to the shaft from the power takeoff 36 of the truck by a transmission shaft 37 having a conventional driving engagement with the drum shaft. The cable 31 extends rearwardly from the drum and is secured to a bridle 38 which is also formed of wire cable and has its arms or end portions 38' diverging rearwardly and secured at their ends to brackets 39 carried by the runners in spaced relation to the front end of the body. The cable 32 is longer than the cable 31 and extends rearwardly from the drum and upwardly about the roller 13 from which it extends forwardly to the front end of the body and upwardly with its upper end connected with an eye bolt 40 which is passed vertically through the cross bar 24 and carries a nut 41 by means of which the bolt is adjusted to place the cable under proper tension. Before reaching the roller 13 the cable 32 passes across a guide pulley or roller 42 and between this pulley and the drum the cable is engaged by the under portion of a roller 43 which forms an element of a tightener 44 and is rotatably carried by a substantially U-shaped yoke 45 having its arms extending rearwardly at an upward incline and pivotally mounted in bearings 46 carried by the chassis bars 5. When the drum is turned in one direction the cable 31 is unwound from the drum while the cable 32 is wound thereon. Pull exerted by the cable 32 draws the body rearwardly until the body tilts across the wheels 17 and the rear end of the body engages the ground along which the wheels or rollers 29 move until the front end of the runners move downwardly along the downwardly turned ends of the rails and onto the ground. The cable 31 unwinds from the drum at the same speed at which cable 32 is wound thereon and this cable 31 acts as a check to prevent the body from moving rearwardly and downwardly onto the ground at too fast a speed, thereby preventing damage by jolting contact of the body with the ground. When the drum is turned in the opposite direction the cable 31 is wound upon the drum while cable 32 is unwound therefrom and the cable 31 will pull the body upwardly onto the rails and forwardly until it is in its normal position where it is held against displacement from the rails by the keepers 26 and 27. It will thus be seen that the body may be shifted longitudinally of the truck onto the ground and then returned to its original position upon the truck and the truck may be very easily unloaded or loaded while the body is at rest upon the ground.

Having thus described the invention, what is claimed is:

1. A truck comprising a chassis having chassis bars, cross bars mounted across said chassis bars, rails extending longitudinally of the chassis and mounted upon said cross bars and having rear end portions bent downwardly, a body including a platform and runners under the platform extending longitudinally thereof, said runners resting upon said rails and having front portions bent upwardly and forming standards at opposite sides of the front end of the platform, a cross head carried by and extending between upper ends of said standards, a horizontal roller rotatably mounted between said rails at upper ends of the downwardly bent rear ends thereof, a horizontal drum rotatably mounted between the chassis bars, cables wound about said drum in opposite directions, one cable extending from the drum towards the rear end of the chassis and brought upwardly about the roller and forwardly and having its front end portion carried upwardly between the standards and connected with the cross head, the other cable extending rearwardly from the drum and connected with a bridle having portions extending rearwardly from the said cable in diverging relation to each other and secured at their rear ends to the runners, and means for transmitting rotary motion from a power take-off of the truck to the drum.

2. A truck comprising a chassis having chassis bars, cross bars mounted across said chassis bars, rails extending longitudinally of the chassis and mounted upon said cross bars and having rear end portions bent downwardly, a body including a platform and runners under the platform extending longitudinally thereof, said runners resting upon said rails and having front portions bent upwardly and forming standards at opposite sides of the front end of the platform, a cross head carried by and extending between upper ends of said standards, a horizontal roller rotatably mounted between said rails at upper ends of the downwardly bent rear ends thereof, a horizontal drum rotatably mounted between the chassis bars, cables wound about said drum in opposite directions, one cable extending from the drum towards the rear end of the chassis and brought upwardly about the roller and forwardly and having its front end portion carried upwardly between the standards and connected with the cross head, a yoke pivotally mounted between the chassis bars rearwardly of the drum and having arms extending forwardly and carrying a roller resting upon the said cable and constituting a tightener for the cable, the other cable extending rearwardly from the drum and connected with the runners, and means for imparting rotary movement to the drum.

3. A truck comprising a chassis having chassis bars, rails extending longitudinally of the chassis and having depending arms at the rear end of the chassis, a body normally disposed over the chassis and including longitudinally extending runners resting upon the rails and slidably mounting the body for longitudinal movement from its normal position over the chassis to a loading and unloading position at rest upon the ground back of the chassis, said runners having forward portions extending upwardly and forming standards engaging the arms of the runners during movement of the body off of and back upon the chassis, a cross head carried by extending between upper ends of said standards, an eyebolt threaded vertically through the cross head and having its eye at its lower end, a drum rotatably mounted between the chassis bars, a roller rotatably mounted between rear portions of said rails, a cable wound about said drum and extending therefrom rearwardly of the chassis and being trained upwardly about the roller and extending forwardly therefrom and upwardly between the standards with its end secured through the eye of the eye bolt, a second cable wound about the drum in a direction opposite to that of the first cable and extending rearwardly from the drum and connected with the runners, and means for rotating said drum.

4. A truck comprising a chassis having chassis bars, rails extending longitudinally of the chassis and having depending vertically disposed guiding arms at the rear end of the chassis, a body normally disposed over the chassis and including longitudinally extending runners resting upon the rails and slidably mounting the body for longitudinal movement along the rails and the depending arms thereof from its normal position over the chassis to a lowered loading and unloading position in which it rests flat upon the ground back of the chassis, said runners having upwardly projecting forward portions disposed in position for abutting the depending arms of the rails in face to face engagement therewith and guiding movement of the runners off of and onto the rails, a drum rotatably mounted between the chassis bars adjacent the front end of the body, cables wound in opposite directions about said drum, a cable guide carried by rear portions of the rails, one cable being trained about the guide and extending forwardly therefrom and connected with the front end portion of the body and the other cable extending rearwardly from the drum and connected with the body, and means for rotating the drum.

5. A truck comprising a chassis, rails mounted longitudinally of the chassis and having downwardly extending guide portions at the rear end of the chassis, a body including runners slidably resting upon the rails and carrying cross bars upon which a platform is mounted, the body being shiftable longitudinally along the rails from a normal position over the chassis at rest upon the rails to a position off of rear ends of the rails in which it extends horizontally at rest upon the ground back of the chassis, said runners having upwardly extending front ends disposed in position adapting them to have face to face engagement with the downwardly extending rear guide of the rails and guide movement of the body off of and onto the rails, means for shifting the body longitudinally and vertically off of and onto the rails, and latch members engageable with portions of the body to secure the body against vertical tilting when in its normal position upon the chassis.

6. A truck comprising a chassis, rails mounted longitudinally of the chassis and having downwardly extending rear portions at the rear end of the chassis, a body including runners slidably resting upon the rails and carrying cross bars upon which a platform is mounted, the body being shiftable longitudinally along the rails from a normal horizontal position over the chassis to a lowered horizontal position at rest upon the ground back of the chassis, said runners having vertical front end portions extending upwardly in position adapting them for abutting face to face engagement with the downwardly extending rear portions of the rails to guide movement of the body off of and onto the rails, means for shifting the body longitudinally off of and onto the rails, front and rear keepers carried by and extending upwardly from said rails and each having its upper portion formed with a rearwardly extending bill, the bills of the front keepers being engaged with the forward one of said cross bars and the bills of the rear keepers being engaged with a rod extending transversely of the body between the runners thereof to hold the body against vertical movement when the body is shifted forwardly along the rails to its normal position upon the chassis.

FRANK P. ANDERSON.
EDWIN E. ANDERSON.
RAYMOND L. ANDERSON.

REFERENCES CITED

The following references are of record in the file of this patent:

UNITED STATES PATENTS

| Number | Name | Date |
| --- | --- | --- |
| 1,870,573 | Kuchar | Aug. 9, 1932 |
| 1,885,399 | Wren | Nov. 1, 1932 |
| 2,016,130 | Wren | Oct. 1, 1935 |
| 2,089,717 | Stratton et al. | Aug. 10, 1937 |
| 2,298,982 | Smith | Oct. 13, 1942 |
| 2,437,479 | Price | Mar. 9, 1948 |
| 2,478,658 | Harbers | Aug. 9, 1949 |
| 2,508,740 | Alvare | May 23, 1950 |
| 2,534,156 | Wyatt et al. | Dec. 12, 1950 |